United States Patent [19]

Kerdranvat et al.

[11] Patent Number: 5,600,572
[45] Date of Patent: Feb. 4, 1997

[54] METHOD FOR TRANSMISSION OF VARIABLE-FORMAT IMAGES VIA LOW DATA RATE TRANSMISSION SYSTEMS

[75] Inventors: Michel Kerdranvat, Bischoffsheim; Jean Y. Moraillon, Molsheim, both of France

[73] Assignee: Thomson Consumer Electronics S.A., Courbevoie, France

[21] Appl. No.: 400,087

[22] Filed: Mar. 7, 1995

[30] Foreign Application Priority Data

Mar. 25, 1994 [FR] France ................................. 94 03547

[51] Int. Cl.⁶ ................................................. H04N 1/415
[52] U.S. Cl. ...................... 364/514 A; 382/232; 348/441
[58] Field of Search ..................... 364/514 A; 348/445, 348/441, 426, 469; 382/166, 232, 250

[56] References Cited

U.S. PATENT DOCUMENTS

| | | | |
|---|---|---|---|
| 4,949,169 | 8/1990 | Lumelsky et al. | 358/86 |
| 5,062,136 | 10/1991 | Gattis et al. | 380/18 |
| 5,347,600 | 9/1994 | Barnsley et al. | 382/56 |
| 5,457,780 | 10/1995 | Shaw et al. | 395/165 |
| 5,459,515 | 10/1995 | Chevance et al. | 348/402 |
| 5,537,150 | 7/1996 | Sugiyama et al. | 348/558 |

FOREIGN PATENT DOCUMENTS

| | | |
|---|---|---|
| 0314122 | 5/1989 | European Pat. Off. . |
| 0320828 | 6/1989 | European Pat. Off. . |
| 2551664 | 6/1977 | Germany . |
| 61-013768 | 1/1986 | Japan . |
| 02027889 | 1/1990 | Japan . |
| 04159890 | 6/1992 | Japan . |
| 05130598 | 5/1993 | Japan . |
| 2219465 | 12/1989 | United Kingdom . |

OTHER PUBLICATIONS

Matsuda et al., *Digital Signal Processing Technology for Communications*, Fujitsu Scientific & Technical Journal, vol. 28, No. 2, 1992, XP312063, pp. 228–240.

*Primary Examiner*—Ellis B. Ramirez
*Assistant Examiner*—Patrick J. Assouad
*Attorney, Agent, or Firm*—Joseph S. Tripoli; Ronald H. Kurdyla; Alexander J. Burke

[57] ABSTRACT

The invention discloses a method for coding a video image on a pixel block basis in a transmission system including at least one transmitter and one receiver, where the video image is in one of several possible display formats. The method comprises:

(a) defining a first image display format that encompasses each of the several image display formats;
(b) dividing the first image format into pixel blocks;
(c) assigning labels to the first image format blocks so that they can be individually addressed;
(d) selecting a second image display format for the video image that is encompassed by the first image display format; and
(e) coding the video image with reference to the individual addresses of the first image format block.

A method of decoding transmissions coded by the disclosed coding method is also presented.

The invention is applicable to videophones and television transmission systems.

11 Claims, 1 Drawing Sheet

METHOD FOR TRANSMISSION OF VARIABLE-FORMAT IMAGES VIA LOW DATA RATE TRANSMISSION SYSTEMS

BACKGROUND OF THE INVENTION

The invention concerns a procedure for transmission of variable-format images over low data rate transmission systems. The invention is applicable, for example, to videophone systems.

The international standard CCITT H.261 gives the specifications of a codec (coder-decoder) of video signals for audiovisual services with a data rate of p×64 Kbits/s. This standard prescribes in particular a source image format known as QCIF, which corresponds to a resolution of 144 lines of 176 pixels. To reduce the throughput of transmitted data, a compression process based on the following steps is used: prediction based on movement estimation, mapping into the frequency domain using a discrete cosine transformation (DCT), quantization of the frequency coefficients and coding of these coefficients using a variable-length code.

The DCT transform is applied to luminance blocks of 8 pixels by 8 pixels. For the estimation of movement and for transmission, blocks are grouped into macroblocks containing 4 adjacent luminance blocks totaling 16 pixels by 16 pixels. In this way an image in QCIF format includes 9 macroblocks vertically and 11 macroblocks horizontally.

Videophones currently on the market also use other image formats, specifically formats of 112 lines of 128 pixels and 96 lines of 128 pixels, respectively known as QCTX and MVTS.

SUMMARY OF THE INVENTION

The present invention proposes a transmission format and a data processing scheme in a receiver and a transmitter which guarantees maximum compatibility between different source image formats, specifically the three formats QCIF, QCTX and MVTS mentioned above.

The invention comprises a method for coding a video image on a pixel block basis in a transmission system, where the video image is in one of several possible display formats. The method comprises:

(a) defining a first image display format that encompasses each of the several image display formats;

(b) dividing the first image format into pixel blocks;

(c) assigning labels to the first image format blocks so that they can be individually addressed;

(d) selecting a second image display format for the video image that is encompassed by the first image display format; and (e) coding the video image with reference to the individual addresses of the first image format block.

In a feature of the invention, the method is implemented in a communication system comprising at least two transceivers.

In another feature of the invention, the transceivers exchange data on the picture formats they can display, the smallest of the formats being used for transmission.

In another feature of the invention, a transmitter in the system encodes only blocks of pixels which a receiver can display.

In another feature of the invention, smaller picture formats are used for transmission between the transceivers during fall-back modes.

In another feature of the invention, the encompassing first image display format has horizontal and vertical dimensions greater than or equal to the corresponding dimensions of all other formats.

In another feature of the invention, a method for decoding pictures coded according to the previous method is disclosed. Specifically, in a transmission system including an image display device receiving pictures of smaller format than the device is capable of displaying, the decoding method provides that only blocks corresponding to this smaller format are displayed.

In another feature of the invention of the decoding method, all other blocks are displayed as a blank border.

In another feature of the invention, the decoding method includes the step of determining the original format of the picture transmitted by analyzing the non-coded blocks. The two communication devices in the transmission system use a common data transmission format, although the formats of their respective images may not be the same.

BRIEF DESCRIPTION OF THE DRAWINGS

In the drawing:

FIG. 1 shows the positions of the macroblocks of an image in QCTX format compared with an image in QCIF format, according to the principles of the invention.

FIG. 2 shows the positions of the macroblocks of an image in MVTS format compared with an image in QCIF format, according to the principles of the invention.

DETAILED DESCRIPTION

For the purpose of the following discussion transmitters and receivers use coding and decoding methods based on a pixel block treatment of images. Compression is achieved using quantization of frequency coefficients obtained from blocks of pixels or pixel differences, variable length coding of the quantized coefficients and a prediction method based on motion compensation. Such compression systems are well known in the art and will not be described in further detail, unless such details are necessary for the comprehension of the embodiments. The H.261 document mentioned earlier defines an example of such a system.

Figures 1, 2:
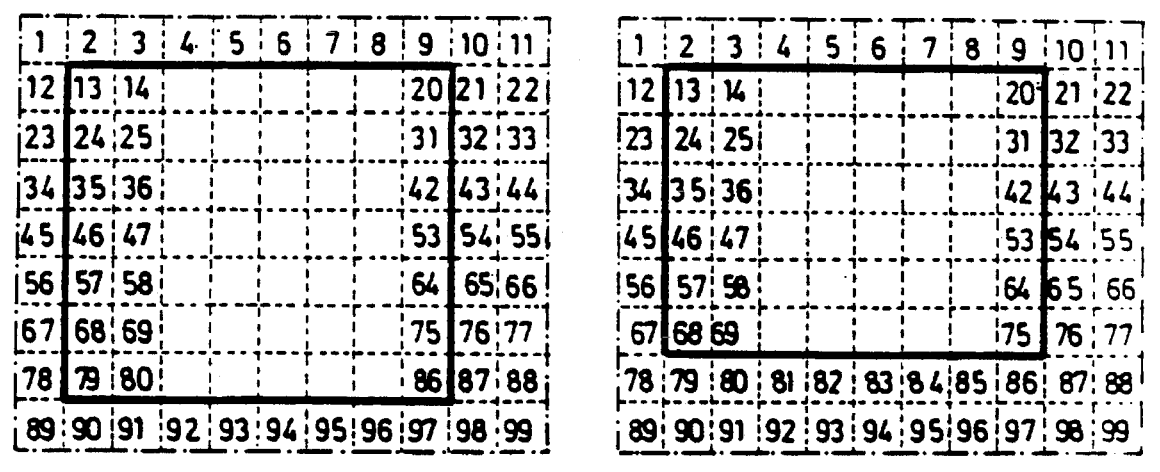

In the present example, the larger image format (both horizontally and vertically) is the QCIF format of 9×11 macroblocks. These macroblocks are numbered from 1 to 99 in FIG. 1.

In a first embodiment, the receiver is capable of processing and displaying images in QCIF format, whereas the transmitter can transmit images in any of the formats QCIF, MVTS or QCTX. At the start of communication, the transmitter sends to the receiver information defining the format of the images which are to follow. In the present example, this information consists of a byte whose four most significant bits represent the number of macroblocks along the horizontal direction and whose four least significant bits represent the number of macroblocks along the vertical direction. For images in QCTX format, this byte takes the hexadecimal value 87 H and for the MVTS format, its value is 86 H. This information enables the decoder to display only those blocks corresponding to the original image format. The other blocks, left "empty" around the picture of smaller format, are not coded by the transmitter. The header of the non-coded macroblocks includes a flag or skipping code indicating this non-coded state.

FIGS. 1 and 2 illustrate respectively the positions of the QCTX and MVTS formats relative to the QCIF format and the correspondences between the macroblocks.

When the transmitter codes images in QCTX format, it codes and sends only the 7×8 macroblocks corresponding to this format. The macroblocks 1 to 11, 12, 23, 34, 45, 56, 67, 78, 21, 22, 32, 33, 43, 44, 54, 55, 65, 66, 76, 77, 78, 87, 88 and 89 to 99 are neither coded nor transmitted. These macroblocks correspond to those outside the inner box in FIG. 1.

When the transmitter codes the images in MVTS format, the following macroblocks are neither coded nor transmitted: 1 to 11, 12, 21, 22, 23, 32, 33, 34, 43, 44, 45, 54, 55, 56, 65, 66, 67, 76, 77, and 78 to 99.

The coding of the data for transmission is the same as for a QCIF image. The numbering (or addressing) of the macroblocks is always based on the QCIF format. However, the information concerning the macroblocks listed above is neither coded nor transmitted, since these macroblocks do not contain image information.

The receiver recognizes the information defining the format of the images received. The border of the screen corresponding to the non-coded macroblocks is displayed in the form of a blank frame. Alternatively, the border can be used to display information to the user, for example, information concerning the operation of the receiver. The active image part corresponding to the macroblocks transmitted is decoded in the normal manner and displayed on the part of the screen assigned to it through the macroblock numbering. The transmitter can consequently define the placing of the smaller format picture on the screen of the receiver.

In a variant of this first embodiment, the information concerning the format of the transmitted picture is in the form of a pointer which indicates a position in a table containing the various format sizes. This table is stored in receiver memory. In another variant of the first embodiment, the information defining the image formats is transmitted periodically during the communication.

In another variant of the first embodiment, the image format used in the transmitter is deduced in the receiver by identifying the non-coded blocks in the images received. For instance, when the coded macroblocks received by the receiver define a picture of 7×8 macroblocks, the receiver deduces that the effective format of the picture within the QCIF encompassing format, is a QCTX format. For this purpose, the possible formats are stored within the receiver.

The first embodiment described above concerns transmission by a transmitter whose image formats are smaller than, or equal to, those of the receiver.

The second embodiment concerns bi-directional communication between two transceivers (transmitter-receivers) A and B having different image formats. In this case, the relative format of the images is still as shown in FIGS. 1 and 2. At the start of communication, the two devices determine which of the image formats among those they can display is the smallest, this format is then used for the transmission. For this purpose, each of the two devices sends information identifying the largest image format it can display. Each device compares the information received with the information it has sent and determines the smaller format. It is this smaller format which is to be used for transmission.

In the description below it is assumed that a device A uses a QCIF format and that a device B uses a QCTX format, which is smaller than the QCIF format. The coding carried out by device B and the decoding carried out by device A are similar to those in the first embodiment. Device B codes the macroblocks containing image information using a numbering system such as that shown in FIG. 1. Device A displays the images received, also as shown in FIG. 1, with a blank band in the place of the macroblocks on the outside of the inner box of FIG. 1.

The coding carried out by device A concerns only the macroblocks within the inner box of FIG. 1. The macroblocks outside this box are not coded, even though they contain image information. The image is therefore truncated. This results in a reduced amount of coded data being transmitted. The coding of macroblocks which are not displayed by the receiver is consequently avoided.

According to a variant of this second embodiment, the band pass gain obtained through the reduction in the amount of data transmitted, in at least one direction of communication, is used to increase the quality of the coded macroblocks. This can be achieved by coding more blocks according to an intrablock mode, or by diminishing the quantization step size used for the coefficient quantization.

The relative positions of the formats can be different from those proposed above and defined in FIGS. 1 and 2.

The invention is not limited to the embodiments above. In particular, the invention can be used in conjunction with the fall-back modes of modems (modulator-demodulators) used for the transmission. In this case, an image format is associated with each fall-back mode. The largest image format is used when the transmission can be performed in normal conditions and at the maximum data rate. If for any reason the communication link is degraded, the modems fall back to one or more transmission modes at a lower data rate (with, in a variant, better protection against transmission errors), in which smaller image formats are used. This enables the same image frequency to be used for different image formats.

It has been assumed so far that among the considered image formats, there is one format which has greater or equal dimensions, both vertically and horizontally, compared to all other formats. In other words, it has been assumed that one format may encompass each of the other formats. According to a variant of the two embodiments above, in the case where there is a first format having the greater horizontal dimension and a second format having the greater vertical dimension, a pseudo-format is defined. This pseudo-format possesses both of the greater dimensions and is used to define the macroblock numbers or addresses as explained above.

According to a variant of the embodiments, when a transmitter codes a picture of a smaller format than the format of greatest dimensions, all macroblocks which do not belong to the smaller format are coded, but as if they corresponded to macroblocks of well correlated pixels. Macroblocks which do not belong to the smaller format may be coded with a minimum amount of data as macroblocks of uniform luminance, for example. A macroblock of pixels of uniform value is preferred. Transform coding will then yield only DC coefficients for such macroblocks. All AC coefficients will be zero, minimizing the data to be transmitted. Thus, a receiver does not need to discriminate between macroblocks belonging to the picture of smaller format and other macroblocks. It will simply decode all macroblocks it can display. This aspect is particularly useful in prediction based systems, in which a non-coded macroblock is replaced in a receiver with a macro-block of a preceding picture, stored in an appropriate memory. If such a precaution were not taken (or a macro-block discriminated as explained earlier), then part of the content of this memory would be displayed, whatever this content may be. Although this would not hide any active part of the picture transmitted, it may nevertheless be irritating for the viewer.

Even though it is preferred that a common transmission format between two transceivers is determined in order to minimize the amount of data to be transmitted, the invention is not limited by this aspect. Both transceivers may transmit pictures without taking into account the capacity of the other transceiver.

Lastly, the principles of the invention may be used with more than two transceivers.

What is claimed is:

1. A method for coding a video image on a pixel block basis in a transmission system, said video image exhibiting one of a plurality of image display formats, comprising the steps of:

(a) defining a first image display format that encompasses each of said plurality of image display formats;
   (b) dividing said first image format into pixel blocks;
   (c) assigning labels to said first image format blocks so that said first image blocks can be individually addressed;
   (d) selecting a second image display format for said video image, said second image display format being encompassed by said first image display format; and
   (e) coding said video image in said second image display format with reference to said individual addresses of said first image format blocks.

2. The method defined in claim 1, wherein said transmission system comprises first and second transceivers each including a transmitter and a receiver device for implementing said method.

3. The method defined in claim 2, wherein said transceivers employ the steps of:
   exchanging data concerning said first and said second image display formats; and
   selecting the smallest of said first and said second image display formats for transmission.

4. The method defined in claim 3, wherein a transmitter performs the step of coding only blocks of pixels of said video image that a receiver is able to display.

5. The method defined in claim 2, wherein said communication system employs the step of using smaller image formats during periods when less bandwidth is available on a communication link between said transceivers.

6. The method defined in claim 1, wherein said first image display format has horizontal and vertical dimensions greater than or equal to the corresponding dimensions of said plurality of image display formats.

7. The method defined in claim 3, further including the step of exchanging data which indicates that a block has not been coded.

8. A method for coding and decoding a video image, wherein said video image exhibits one of a plurality of image display formats and is coded on a pixel block basis in a transmission system that displays image formats up to a display screen size, comprising the steps of:

(a) defining a first image display format that encompasses each of said plurality of image display formats;
   (b) dividing said first image format into pixel blocks;
   (c) assigning labels to said first image format blocks so that said first image blocks can be individually addressed;
   (d) selecting a second image display format for said video image, said second image display format being encompassed by said first image display format and being smaller than said display screen size;
   (e) coding said video image with reference to said individual addresses of said first image format block;
   (f) decoding said coded video image; and
   (g) displaying only blocks corresponding to said smaller second image format.

9. The method defined in claim 8, wherein step (g) further includes the step of displaying blocks, as a blank border, that do not correspond to said smaller second image format.

10. The method defined in claim 8, further including the step of analyzing non-coded blocks of said coded video image format to determine said second image display format.

11. The method defined in claim 8, wherein step (e) further includes the step of producing for coding well-correlated pixel blocks that do not correspond to said smaller second image format to fill the border between said display screen size image and said second image.

* * * * *